United States Patent
Tsune

[11] Patent Number: 5,769,597
[45] Date of Patent: Jun. 23, 1998

[54] APPARATUS FOR LOADING ELONGATED WORKPIECES

[75] Inventor: Ryoichi Tsune, Toyama, Japan

[73] Assignee: Tsune Seiki Co., Ltd., Japan

[21] Appl. No.: 877,547

[22] Filed: Jun. 17, 1997

[30] Foreign Application Priority Data

Jun. 17, 1996 [JP] Japan .................................. 8-155816

[51] Int. Cl.[6] .................................................. B65G 29/02
[52] U.S. Cl. .................................. 414/746.2; 414/746.1
[58] Field of Search ........................... 198/468.7, 774.1; 414/745.9, 746.1, 746.2

[56] References Cited

U.S. PATENT DOCUMENTS

| | | | |
|---|---|---|---|
| 3,306,472 | 2/1967 | Blanz | 414/746.2 X |
| 3,655,067 | 4/1972 | White | 414/746.2 |
| 3,757,960 | 9/1973 | Hill et al. | 414/745.9 X |

*Primary Examiner*—Janice L. Krizek
*Attorney, Agent, or Firm*—Schweitzer Cornman Gross & Bondell LLP

[57] ABSTRACT

Apparatus for loading elongated workpieces that have a circular cross-section, including: (i) a horizontal work transfer section having horizontal rollers for longitudinally movably supporting workpieces; (ii) a plurality of sloping rails for downwardly rollably supporting workpieces parallel to each other, the rails sloping toward and overhanging from one side of the work transfer section; (iii) a plurality of movable stoppers for stopping the first of the downwardly rolling workpieces on the rails, and each stopper being movable along a sloping rail; (iv) a shifter for moving the movable stoppers along the sloping rails; (v) a lock for locking the stoppers in a preselected moved position; (vi) a plurality of work shifters for lifting the lowermost workpiece on the rails and moving it onto the horizontal rollers in the horizontal work transfer section, the work shifters each having a sloping top support surface for the lifting of workpieces, and being adapted for vertical movement along respective vertical planes disposed at a substantially right angle to the workpieces on the rails. (vii) a plurality of fixed positioners disposed under the overhang of the rails for laterally positioning one side of a workpiece at a preselected position on the horizontal rollers; and (viii) a plurality of movable positioners disposed along the horizontal work transfer section on the side of a workpiece thereon that is opposite to the side along which the fixed positioners are disposed, for positioning a workpiece on the horizontal rollers in cooperation with the fixed positioner, by the movable positioners being movable toward and away from the fixed positioners.

4 Claims, 6 Drawing Sheets

APPARATUS FOR LOADING ELONGATED WORKPIECES

FIELD OF THE INVENTION

The present invention relates to a loading apparatus with a section for carrying steel bars, steel pipes or other long elongated workpieces having a circular cross-section, to further processing stages, such as a cutting apparatus.

BACKGROUND OF THE INVENTION

Conventional loading apparatus includes a work transfer section having horizontal rollers for longitudinally and movably supporting elongated workpieces. Customarily sloping rails overhang or extend outwardly from one side of the work transfer section, and incline upwardly toward their outer ends. Workpieces can be rollably supported on the sloping rails in parallel with each other. A movable stopper can move along each of the rails, and stop the first, lowermost piece supported on the rails. A shifter can shift the movable stoppers to release a lowermost workpiece. A lock is provided to lock the movable stoppers for adjusting the apparatus. Work shifters can lift the first, the lower most piece on the rails, and move it onto the rollers in the transfer section. Fixed positioners are provided on that side of the horizontal section where the rails are provided. The fixed positioners can position one side of a workpiece at a desired position on the horizontal rollers. A movable positioner can move toward and away from each of the fixed positioners with the horizontal workpiece between them, and position the piece from its other side on the horizontal rollers.

Workpieces are conveyed onto the sloping rails, on which they stand by or wait in parallel to each other, with the first or lowermost piece stopped by the movable stoppers. Then the work shifters are moved upwardly to lift the first piece on the rails above the movable stoppers. The lifted piece rolls downward on the sloping support surfaces of the shifters into the horizontal transfer section. Then, the shifters are lowered so that the piece moves downward to between the fixed and movable positioners, and is shifted from the sloping surfaces onto the horizontal rollers in the transfer section. The space between each of the movable positioners and its associated fixed positioner has to be adjusted depending on the diameter of the workpieces to sandwich a workpiece between the positioners. Each of the movable stoppers and an associated movable positioner are interlocked or linked to move together in the same direction. It is therefore possible to adjust the positions of the movable stoppers and positioners at the same time by only operating the work shifter for the movable stoppers. It is also possible to lock the movable stoppers and positioners in their adjusted positions at the same time by actuating the lock.

Each of the work shifters is a plate having a Y-shaped, sloping top support surface. Each of the work shifters is pivotably supported by a horizontal pin which extends at a right angle to the workpieces supported on the sloping rails. Each of the work shifters can vertically pivot on the respective pin along a vertical plane in parallel with the workpieces on the rails. The work shifters are normally retracted in their substantially horizontal positions. To shift a work piece, the work shifters pivot upward in the direction opposite to the direction in which workpieces are carried. While the work shifters pivot upward, their sloping top surfaces lift the workpiece. Thus, the workpiece is lifted by the work shifters pivoting from their horizontal positions upward along their vertical planes in parallel with the workpiece in the direction opposite to the direction in which the workpieces are carried.

While the workpiece is lifted, it is moved by the frictional forces between it and the sloping top surfaces of the work shifters in the direction opposite to the direction in which workpieces are carried. This may dislocate the ends of the workpiece shifted to the transfer section. As a result, the associated cutting apparatus may not cut the piece to precisely constant lengths.

Although each of the movable stoppers and an associated movable positioner are linked to move together in the same direction, they are independent, so that their linking structure is complex and they need a plurality of parts. It is also problematic to assemble these parts in the machine.

SUMMARY OF THE INVENTION

It is an object of the present invention to eliminate any workpiece dislocations as mentioned above, when the first workpiece on the sloping rails is lifted by the work shifters and moved to the work transfer section.

It is another object of the invention to simplify the structure of the movable stoppers and of the movable positioners and to reduce the number of parts so that they are easier to assemble.

According to the present invention, workpieces W are conveyed onto sloping rails, on which they stand by in parallel with each other with the first piece stopped by movable stoppers. Then, work shifters are elevated along vertical planes at right angles with the workpieces on the rails, so that the first workpiece is lifted above the movable stoppers. The lifted workpiece rolls down on the sloping top support surfaces of the shifters, and moves into a work transfer section. Then, the shifters are retracted downward, so that the workpiece is lowered between fixed positioners and movable positioners which locate the workpiece on horizontal transfer rollers.

The workpiece W is lifted to its elevated position by the work shifters moving upward at a right angle to the workpieces on the sloping rails. The lifting forces of the work shifters act on the lower side of the workpiece at a right angle to it always while the shifters are moving upward. Accordingly, the piece can be shifted in an assured manner in the work transfer section with out being longitudinally dislocated.

The apparatus for loading elongated workpieces that have a circular cross-section comprises: (i) a horizontal work transfer section having horizontal rollers for longitudinally movably supporting workpieces; (ii) a plurality of sloping rails for downwardly rollably supporting workpieces parallel to each other, the rails sloping toward and overhanging from one side said work transfer section; (iii) a plurality of movable stoppers for stopping the first of the downwardly rolling workpieces on said rails, and each stopper being movable along a sloping rail; (iv) a shifter for moving said movable stoppers along said sloping rails; (v) a lock for locking said stoppers in place in a preselected moved position; (vi) a plurality of work shifters for lifting the lowermost workpiece on said rails and moving it onto said horizontal rollers in said horizontal work transfer section, said work shifters each having a sloping top support surface for the lifting of workpieces, and being adapted to move up and down along respective vertical planes disposed at a substantially right angle to said workpieces on said rails. (vii) a plurality of fixed positioners disposed under said overhang of said rails for laterally positioning one side of a workpiece at a preselected position on said horizontal rollers; and (viii) a plurality of movable positioners disposed along said horizontal work transfer section on the side of a workpiece thereon that is opposite to the side along which said fixed positioners are disposed, for positioning a workpiece on said horizontal rollers in cooperation with said fixed positioner, by said movable positioners being movable toward and away from said fixed positioners.

BRIEF DESCRIPTION OF THE DRAWING

The present invention is described below in greater detail with reference being had to the accompanying drawing, in which.

DETAILED DESCRIPTION

Figure 1:
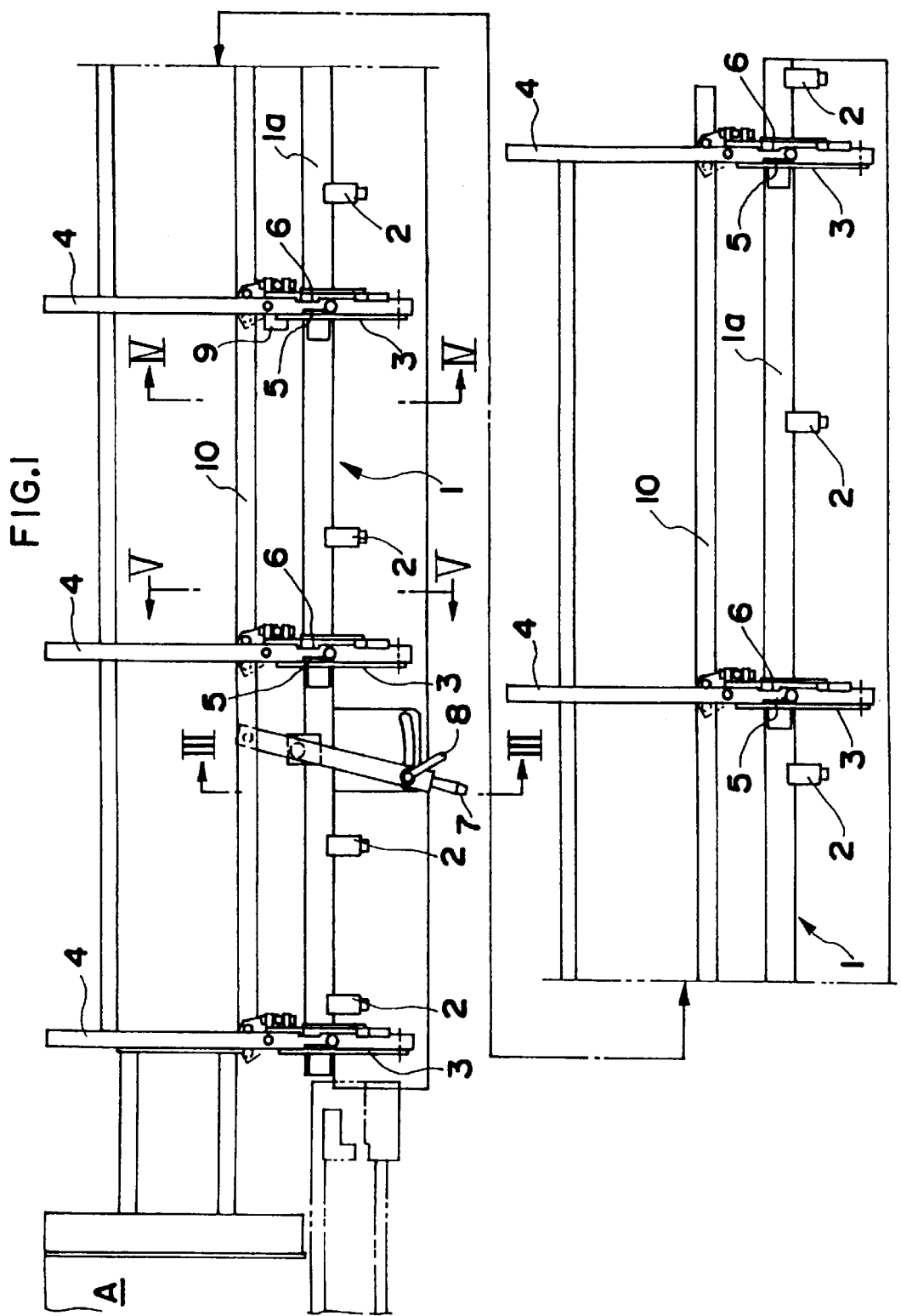
FIG. 1 is a schematic plan view of a loading apparatus of the invention.
Figure 3:
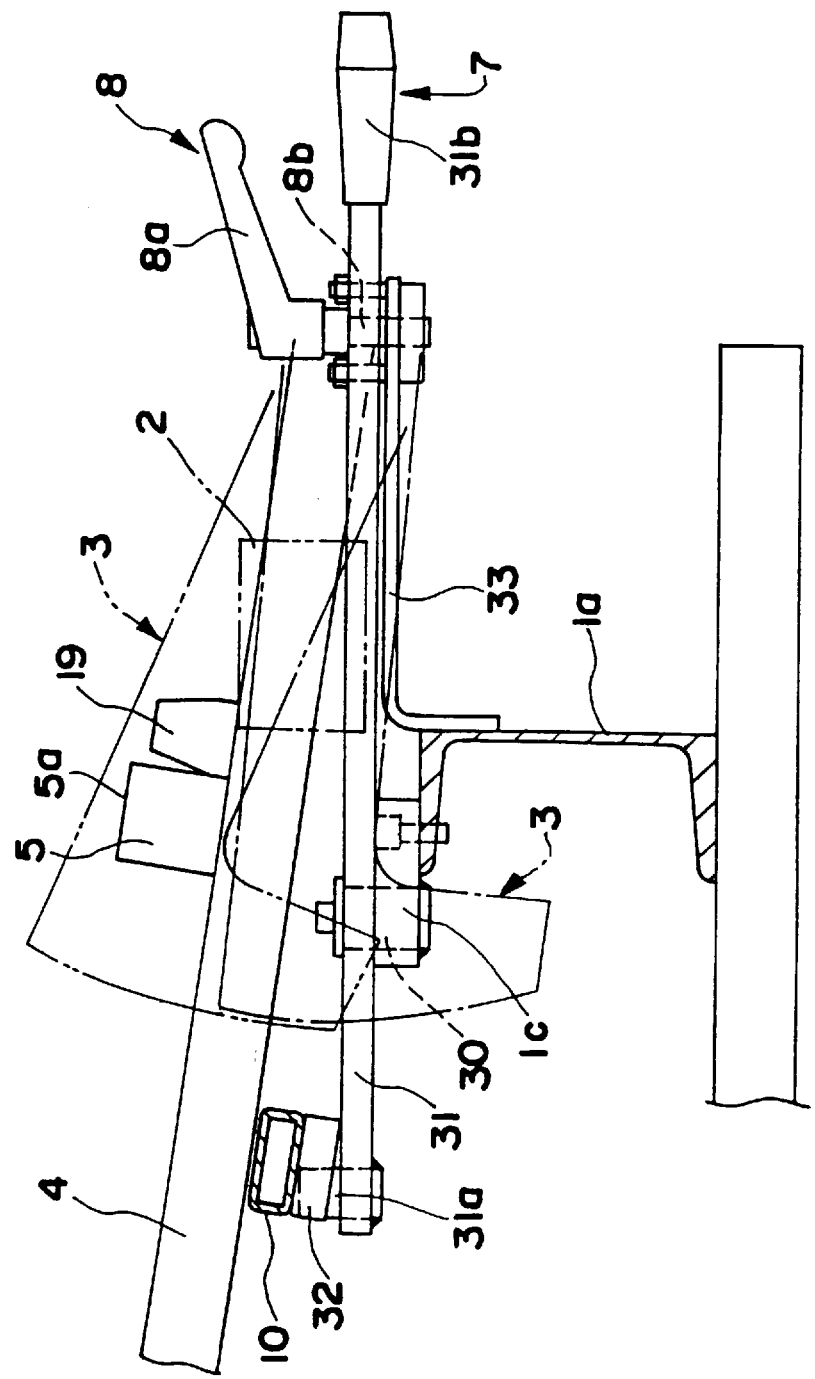
FIG. 3 is an enlarged cross-sectional view taken along the line X—X of FIG. 1.
Figure 4:
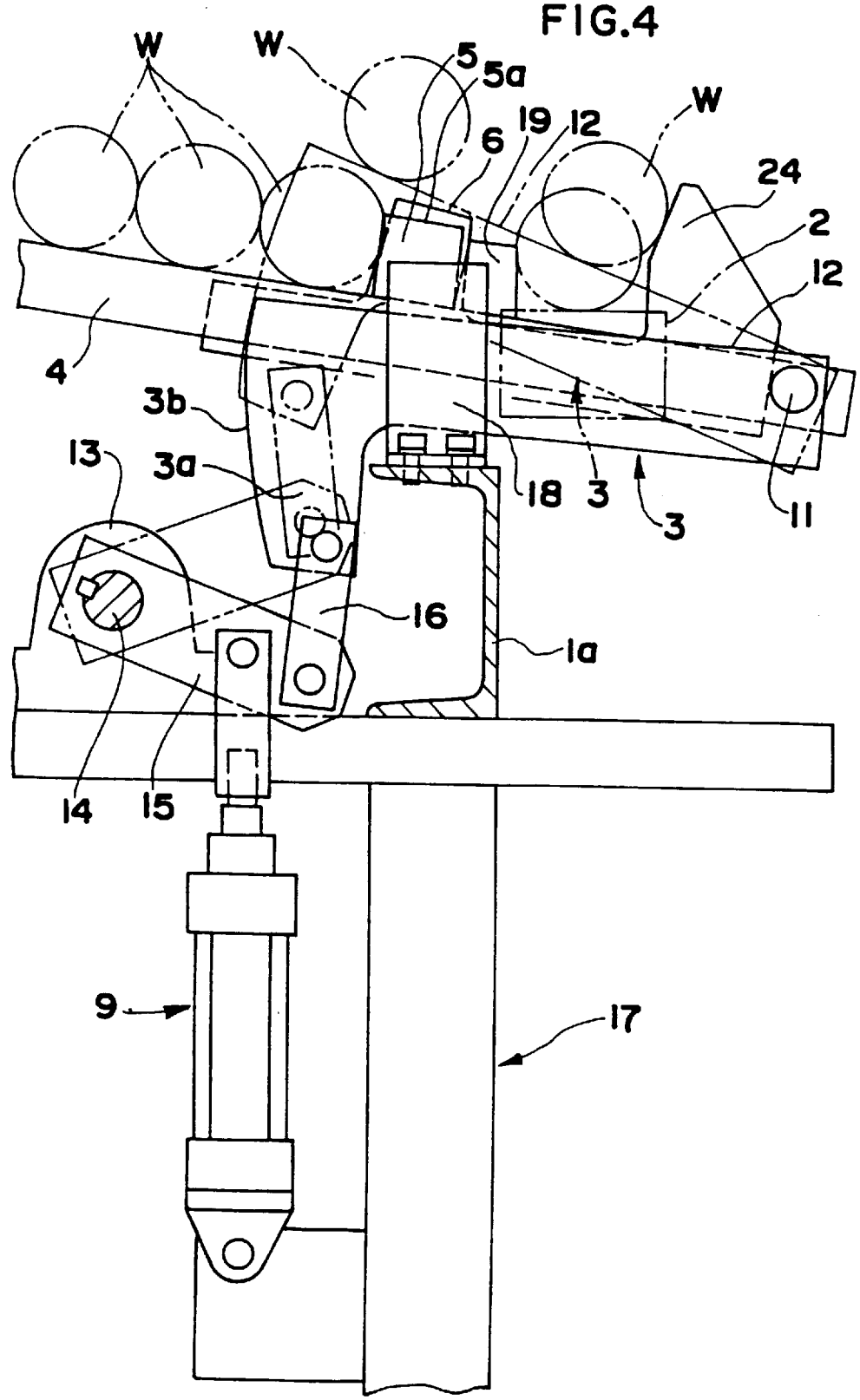
FIG. 4 is an enlarged cross-sectional view taken along the line Y—Y of FIG. 1.
Figure 5:
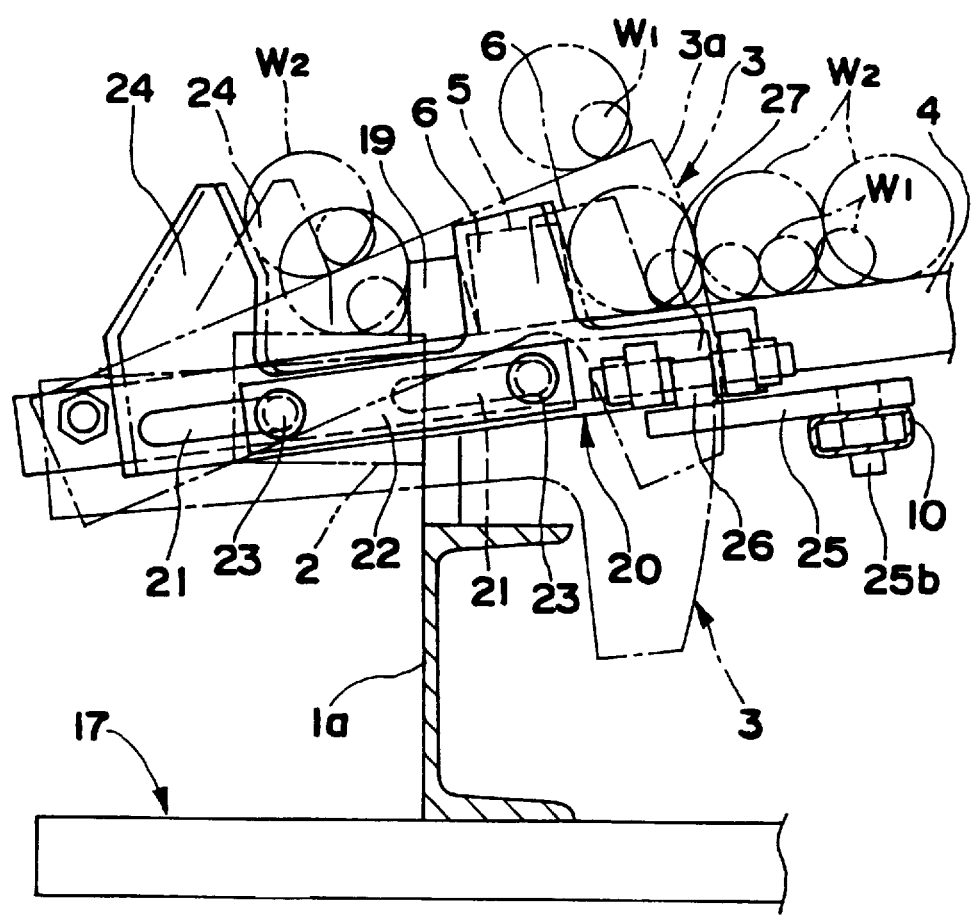
FIG. 5 is an enlarged cross-sectional view taken along the line Z—Z of FIG. 1.

As shown in FIG. 1, the loading apparatus of the present invention has an elongated work transfer section 1 which represents a horizontal carrying path for workpieces to a cutting apparatus A. Horizontal rollers 2 and work shifters 3 are arranged at suitable intervals along the length of and at right angles to the work transfer section 1. The rollers 2 are supported on a horizontal beam 1a, which is affixed to a machine frame 17, as shown in FIGS. 4 and 5, and extends along the length of the transfer section 1. As best shown in FIGS. 3–4, the beam 1a has a square or rectangular lateral cross-section and has one open side. Sloping rails 4 are attached to the frame 17 at suitable intervals on one side of the transfer section 1, and extend at right angle thereto. The rails 4 overhang, and protrude upward and outward from the transfer section 1 at a gentle angle of about 5°–10° with respect to the horizontal.

Figure 2:
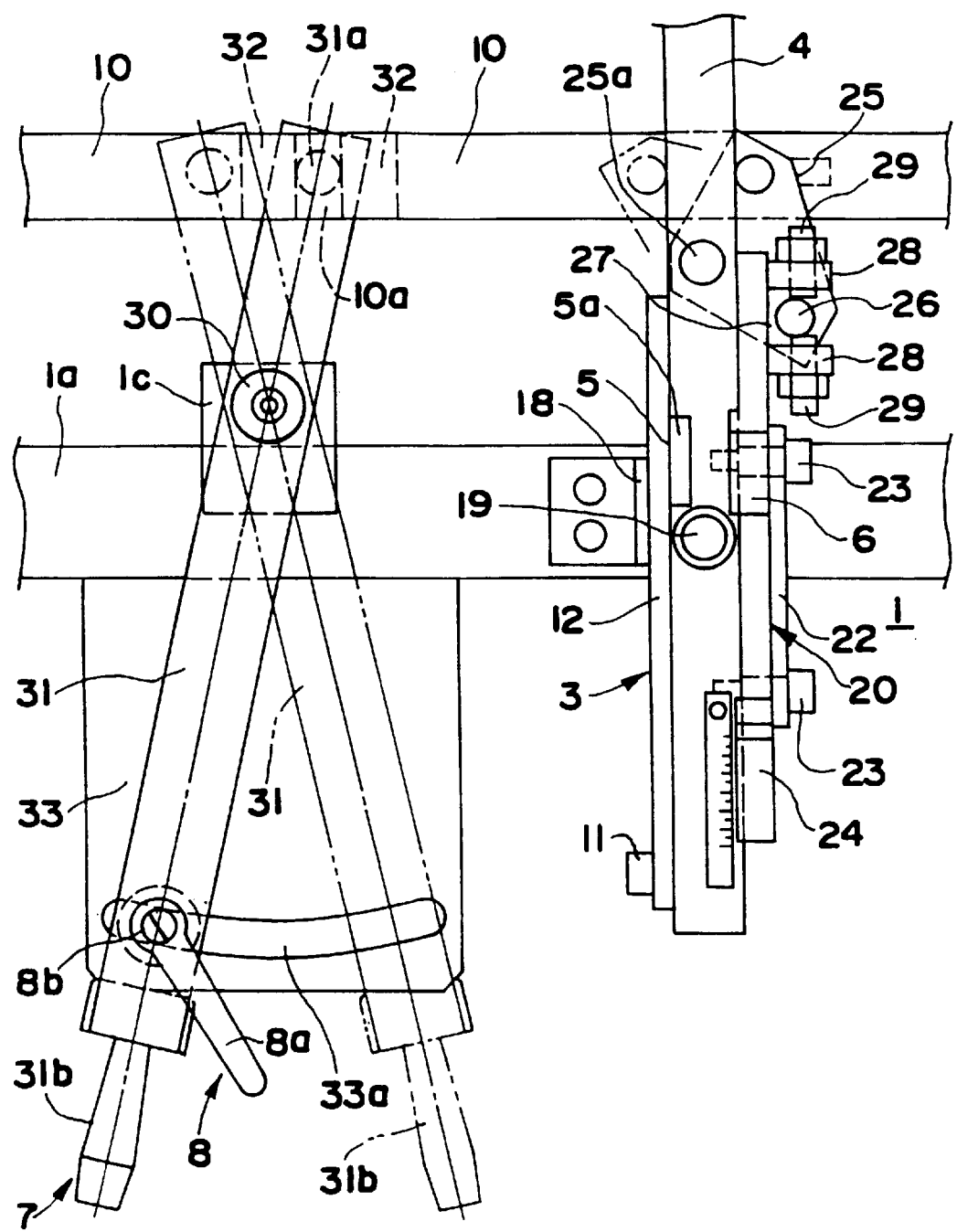
FIG. 2 is an enlarged and detailed plan view of the main part of the apparatus.

As shown in FIGS. 1, 2 and 4, each work shifter 3 is a substantially L-shaped plate, which extends along one side of one of the sloping rails 4 across the work transfer section 1, and each work shifter has a sloping straight top support surface 12. As best shown in FIG. 4, the work shifter 3 is pivoted from the lower end of one side of the associated rail 4 at the outer and lower end of its top surface 12, by a horizontal pin 11. The upper or free end of the work shifter 3 has an integral arm 3a that extends downwardly. The free end of the arm 3a also has an arcuate or circular end surface 3b. The arm 3a is pivoted through a link 16 with one end of an arm 15, and the other end of the arm 15 is attached to a horizontal rotatable interlocking shaft 14. The arm 15 is connected from a hydraulic cylinder 9 for driving all work shifters 3 (FIG. 1). The hydraulic cylinder 9 is mounted from the machine frame 17.

As shown by solid lines in FIG. 4 when the hydraulic cylinder 9 is retracted, a portion of the top surface 12 of each work shifter 3 is positioned slightly below the top surface of the associated sloping rail 4. When the cylinder 9 extends by a specified stroke, the work shifter 3 pivots along a vertical plane at a right angle to the workpieces W on the rail 4, to its elevated position shown by a two-dash broken line in FIG. 4. Thus, the telescoping action of the cylinder 9 reciprocates the work shifter 3 between the elevated and retracted positions. When each work shifter 3 is in its lower position as shown by solid lines in FIG. 4, its top support surface 12 is below the top surfaces of the horizontal rollers 2.

The interlocking shaft 14 is supported by bearings 13 from the machine frame 17, and is linked through the arms 15 and links 16 with the work shifters 3. The actuation of the single hydraulic cylinder 9 rotates the interlocking shaft 14 by the arm 15 by a desired angle. The rotation of the shaft 14 swings the work shifters 3 up and down as described above.

As shown in FIGS. 2 and 4, the horizontal beam 1a supports a vertical guide plate 18, which is attached to the horizontal beam 1a on the side of each work shifter 3 opposite the associated sloping rail 4. When the work shifter 3 is pivoted, it is guided between this guide plate 18 and the adjacent side of the rail 4.

With reference to FIGS. 1–5, each sloping rail 4 has a fixed stopper 5 and a movable stopper 6 both relatively near its lower end. The fixed stopper 5 is a square or rectangular plate which protrudes upwardly from the rail 4. The top surface 5a of this stopper 5 is slightly lower than the upper limiting position of the top surface 12 of the associated work shifter 3. The top surface 5a of the stopper inclines toward the lower end of the rail 4 as the top surface 12 of the work shifter does. A conical roller 19 as a fixed positioner is supported on the top of the rail 4 near the side of the fixed stopper 5 which is near to the lower end of the rail 4. The conical roller 19 is an idler mounted on a vertical axis. The conical roller 19 acting as a fixed positioner defines a preselected reference position for positioning workpieces W.

As best shown in FIG. 5, the movable stopper 6 is integral with a long plate 20, which extends along the side of the sloping rail 4 that is opposite to the associated work shifter 3. The long plate 20 is inclined at the same angle as the rail 4. The movable stopper 6 protrudes upwardly from a longitudinal middle portion of the long plate 20. The plate 20 has a pair of slots 21, which extend and are spaced along it. A horizontal guide pin 23 extends through each slot 21, and each is attached at one end to the adjacent side of the rail 4. The other end of each pin 23 is attached to a supporting plate 22, which extends along the outer side of the long plate 20. Therefore, the long plate 20 is slidably supported along the side length of the rail 4.

The long plate 20 has an integral movable positioner 24, which protrudes upwardly from its lower end. The movable positioner 24 has an upward ranging substantially triangular top. The movable positioner 24 and movable stopper 6 are both integral with the plate 20, and therefore move together when the plate 20 slides along the side of the sloping rail 4, as described above.

As shown in FIGS. 2, 3 and 5, the upper end of the long plate 20 pivotably supports one corner of a nearly triangular linking plate 25 about a pin 25a (FIG. 2), under the associated sloping rail 4. The pin 25a extends at right angles to the rail 4 and plate 25. A pair of brackets 28 are attached to the long plate 20, by a pair of bolts 29. The bolts 29 extend parallel to the associated sloping rail 4, and are axially aligned with each other. The end of the bolts 29 define a space 27 between the bolts 29. The nearly triangular plate 25 supports a roller 26 on its top at another corner. The roller 26 can rotate on an axis at a right angle to the nearly triangular plate 25, and the roller is targeted in the space 27. The nearly triangular plate 25 also supports a linking pin 25b (FIG. 5) on its bottom side at the other corner. The linking pin 25b extends at a right angle to the plate 25. The pins 25b for all rails 4 are rotatably linked to a horizontal linking bar 10, which extends along the work transfer section 1.

As shown in FIGS. 2 and 3, a shifter 7 for the movable stoppers 6 includes a horizontal operating lever 31, which can swing on a vertical pin 30. The pin 30 is supported on a support 1c, which is fixed to the horizontal beam 1a under the work transfer section 1. The lever 31 has a handle or grip 31b on one end and a vertical pin 31a on the other end. The pin 31a ranges into a groove 10a, which is formed across the bottom of the horizontal linking bar 10. The groove 10a is defined between a pair of blocks 32, which protrude from the bottom of the horizontal linking bar 10. When the lever 31 is moved, the linking bar 10 moves longitudinally, pivoting the linking plate 25, so that the movable stoppers 6 shift along the respective sloping rails 4.

As also shown in FIGS. 2 and 3, a lock 8 includes a guide plate 33, which is attached to the horizontal beam 1a under the lever 31. This plate 33 has a horizontal circular guide slot 33a which is concentric with the vertical pin 30. A vertical locking bolt 8b has a locking lever 8a that engages the horizontal lever 31 near its handle 31b. The locking bolt 8b ranges through the slot 33a and is slidable therein. The horizontal lever 31 can be locked against the plate 33 by turning the locking lever 8a, which tightens the bolt 8b. The plate 33 is provided with a scale (not shown) at the slot 33a, for setting the diameters of workpieces that are processed.

The operation of the loading apparatus of the present invention is described next with reference to FIG. 5. Workpieces W1 (shown in single dashed broken lines) and W2 (two-dash broken lines) can be steel bars, steel pipes or the like, which have circular cross sections. The horizontal lever 31 of the shifter 7 is swung by a specified angle to shift the long plates 20 to their upper positions (at the right side in FIG. 5) shown by dashed lines in FIG. 5, for workpieces W1 of the smaller diameter. This shifts the movable stoppers 6 to their upper positions on the left sides of the circular end surfaces 3b of the work shifters 3. This also shifts the movable positioners 24 to their upper positions on the left sides of the fixed rollers 19. Then, the locking lever 8a is turned to attach the shifter 7 to the plate 33.

When the long plates 20 are in their upper positions, the diameter of the small work pieces W1 is nearly equaled by the distance on each sloping rail 4, between the circular end surface 3b of the associated work shifter 3 and the adjacent side of the associated movable stopper 6. On the other hand, the diameter of the workpieces W1 is slightly smaller than the space across the work transfer section 1 between the associated movable positioner 24 and fixed positioner roller 19.

Before shifting, the work shifters 3 stand in their nearly horizontal lower retracted positions shown by solid lines in FIG. 5. The workpieces W1 are placed one after the other on to the sloping rails 4 parallel to the work transfer section 1. The pieces W1 roll down on the rails 4 by gravity, and stand by in parallel to each other on the rails 4, the lowest piece W1 being stopped by the stoppers 6. The free ends of the top surfaces 12 of the work shifters 3 are positioned between the first and second workpieces W1.

The hydraulic cylinder 9 is then extended to pivot the work shifters 3 from their retracted positions shown by single dash broken lines in FIG. 5 to their elevated positions shown by double dash broken lines. As a result, the top surfaces 12 of the shifters 3 lift the first workpiece W1.

In their elevated positions of the work shifters 3, the free ends of their top surfaces 12 are above the tops of the movable stoppers 6. As a result, the lifted workpiece W1 rolls down by gravity on the surfaces 12 until it is stopped by the movable positioners 24.

Then, the hydraulic cylinder 9 is retracted to lower the work shifters 3 to their retracted positions shown by the single dash broken line in FIG. 5. As a result, the workpiece W1 moves downward between each fixed roller 19 and the associated movable positioner 24, and is positioned on the horizontal rollers 2, which are shown by a two dash broken line in FIG. 5. While the workpiece W1 is moving down, it is supported by the positioners 24 and the work shifters 3. Therefore, the pieces W1 move slowly downwardly with the work shifters 3, and are placed on the rollers 2 with minimal impact.

While the work shifters 3 shift and lift the workpiece W1, the work shifters are lifted at a right angle to the workpieces W1 on the sloping rails 4. The lifting work shifters 3 act on the bottom of the workpiece W1 at all times at a right angle thereto while the work shifters 3 are moving upward. Therefore, the workpiece W1 is longitudinally moved as the case can be with conventional apparatus, but the workpiece W1 is positioned in place in the work transfer section 1.

After the work shifters 3 lift the first workpiece W1, and before they have returned to their retracted positions, the second and upper workpieces W1 resting on the sloping rails 4, are stopped by the arcuate end surfaces 3b of the work shifters 3. When the shifters 3 have retracted, the remaining workpieces W1 roll down on the rails 4 and are stopped by the movable stoppers 6.

The workpieces W1 which are thus shifted to the work transfer section 1 are intermittently carried longitudinally to the cutter A by a vise mechanism (not shown) of the cutter A, where they are cut into pieces of desired lengths. After each workpiece W1 is cut, the shifting operation is repeated, so that the workpieces W1 on the sloping rails 4 are shifted one after another to the transfer section 1, from where they are carried to the cutter A.

In changing the workpieces from the small diameter pieces W1 to the large diameter pieces W2 shown by two-dash broken lines in FIG. 5, the lock 8 is loosened, and the horizontal lever 31 of the shifter 7 is swung to shift the long plates 20 to their lower positions shown by two-dash broken lines in FIG. 5. This shifts the movable stoppers 6 to their lower positions for handling the larger diameter of the workpiece W2. This also shifts the movable positioners 24 to their lower positions, which are spaced from the respective fixed positioning rollers 19 by a distance slightly larger than the diameter of the pieces W2. The plates 20 are then fixed in their positions by tightening the lock 8. The pieces W2 are then moved onto the transfer section in the same manner as described in connection with the small workpieces W1.

The space between each movable positioner 24 and the associated fixed position roller 19 has to be adjusted depending on the workpiece diameter. When the workpiece diameter is changed the movable stoppers 6 and positioners have to be shifted by a distance that equals the change in workpiece diameter. Specifically, along the respective sloping rails 4 the stoppers 6 and positioners 24 have to be moved toward the lower ends of the rails 4 for a larger diameter workpiece W2, and in the opposite direction for a smaller diameter workpiece. According to the present invention, each stopper 6 and its associated positioner 24 are integral and can be therefore simultaneously adjusted to their proper positions by the shifter 7 moving the associated long plate 20. The movable stoppers 6 and the movable positioners 24 can be fixed in their positions at the same time by the lock 8. These integral parts can be made of a single plate or the like, and are therefore easier to make, assemble and to adjust.

The shifter 7 can in this manner be used to adjust the positions of the movable stoppers 6 and movable positioners 24 at the same time. It is therefore possible to deal quickly and precisely with changes in workpiece diameters, and the workpieces of various diameters standing by on the sloping rails 4 can be shifted one after another to the work transfer section 1 without any impact from the drop.

The fixed stoppers 5 can be omitted, and other parts or elements can have a modified design from that disclosed in this embodiment of the present invention. The loading apparatus of the present invention can also be used with work carriage sections of other kinds of apparatus requiring the horizontal, longitudinal conveyance of circular cross-section workpieces, other than cutting machines.

Figure 6:
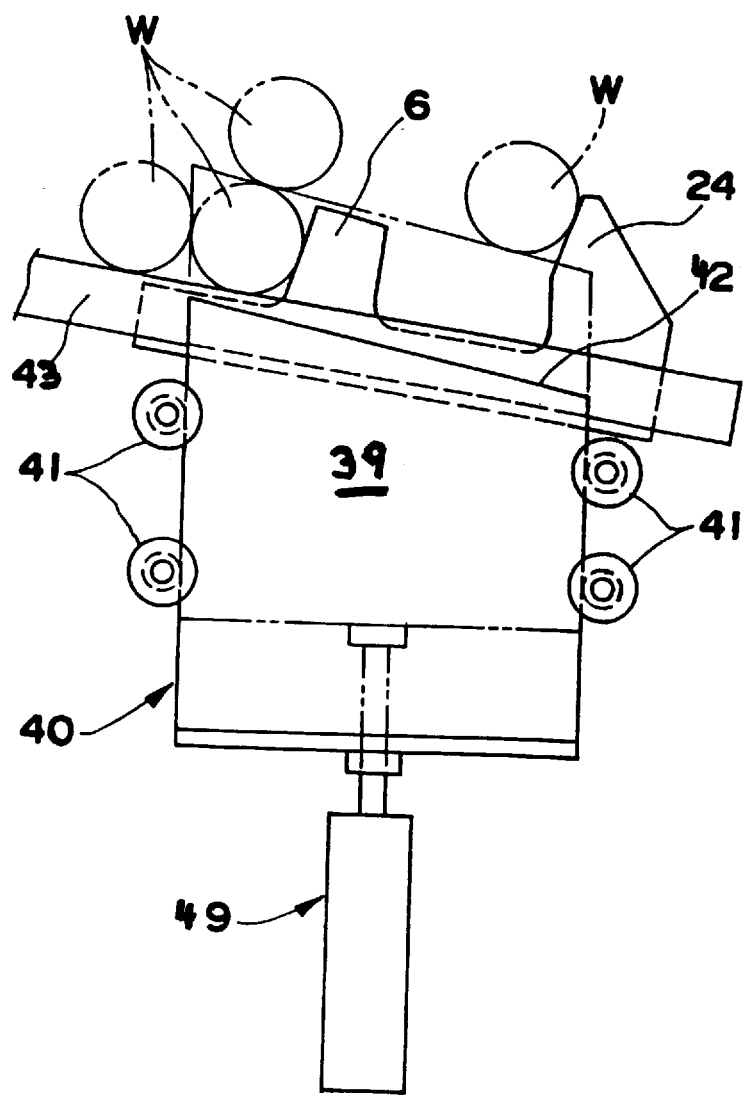
FIG. 6 is a schematic elevational view of a modified work shifter embodiment.

FIG. 6 shows a work shifter 40 of another embodiment in accordance with the present invention. The work shifter 40 has a vertical plate 39 with a sloping top support surface 42, and also has vertical sides guided by guide rollers 41 so that the shifter 40 can move vertically along a plane at a right angle to the workpieces W supported on sloping rails 43. The bottom of the shifter 40 is interlocked with a hydraulic cylinder 49, which can move the vertical plate 39 vertically between its lower retracted position, shown by solid lines, and its elevated position, shown by two-dashed broken lines. The shifter 40 operates in a similar manner as the shifters 3 of the previously described embodiment. Since the shifter 40 can move vertically at a right angle to the workpieces W, it has a simple structure with a small number of parts, and can be inexpensively made.

I claim:

1. Apparatus for loading elongated workpieces that have a circular cross-section, the apparatus comprising:

(i) a horizontal work transfer section having horizontal rollers for longitudinally movably supporting workpieces;

(ii) a plurality of sloping rails for downwardly rollably supporting workpieces parallel to each other, the rails sloping toward and overhanging from one side said work transfer section;

(iii) a plurality of movable stoppers for stopping the lowermost of the downwardly rolling workpieces on said rails, each stopper being movable along a sloping rail;

(iv) a shifter for moving said movable stoppers along said sloping rails;

(v) a lock for locking said stoppers in place in a preselected moved position;

(vi) a plurality of work shifters for lifting the lowermost workpiece on said rails and moving it over onto said horizontal rollers in said horizontal work transfer section, said work shifters each having a sloping top support surface for the lifting of workpieces, and being adapted for vertical movement along respective vertical planes disposed at a substantially right angle to said workpieces on said rails;

(vii) a plurality of fixed positioners disposed on said rails for laterally positioning one side of a workpiece at a preselected position on said horizontal rollers; and (viii) a plurality of movable positioners disposed along said horizontal work transfer section on the side of a workpiece thereon that is opposite to the side along which said fixed positioners are disposed, for positioning a workpiece on said horizontal rollers in cooperation with said fixed positioner, by said movable positioners being movable toward and away from said fixed positioners.

2. The apparatus of claim 1, wherein each of said work shifters is vertically pivotable about the lower end of said sloping top support surface.

3. The apparatus of claim 1 wherein each of said movable stoppers is integral with an associated movable positioner.

4. The apparatus of claim 3 further comprising a plurality of sloping long plates each being slidably disposed along an associated sloping rail, and wherein each of said movable stoppers and its associated movable positioner integrally protrude upwardly from the longitudinal center and the lower end, respectively, of a long plate.

* * * * *